Patented Mar. 11, 1952

2,588,392

UNITED STATES PATENT OFFICE 2,588,392

PROCESS FOR IMPROVING ALKALI-SOLUBLE ACID-PRECIPITABLE VEGETABLE PROTEIN

Percy L. Julian, Maywood, and Sidney J. Circle, Chicago, Ill., and Robert T. MacDonald, Minneapolis, Minn., assignors to The Glidden Company, Cleveland, Ohio, a corporation of Ohio No Drawing. Application April 20, 1948, Serial No. 22,248

15 Claims. (Cl. 260—123.5)

This invention relates to methods for refining alkali-soluble, acid-precipitable vegetable seed protein, and to methods for producing such refined vegetable proteins. The invention also relates to processes for effecting improvements in various characteristics and properties of such proteins.

Those industrial vegetable seed proteins which have become a bulk article of commerce are generally poorer in many of their properties than corresponding specially prepared laboratory samples. As prepared for shipment, the industrial proteins are usually contaminated with gummy or mucilaginous impurities of a non-protein nature and also with small amounts of less desirable protein fractions which are difficultly separable from the bulk of the protein, as well as with mineral salts often introduced in the process of manufacture, thereby suffering the defects of high ash and relatively low protein contents. Dispersions of the industrial proteins (dispersions being the form in which the proteins are most frequently applied) exhibit cloudiness, poor color, and undissolved residues. The painstaking care which may be lavished on the preparation of small experimental samples to alleviate these defects is generally precluded in industrial production by the difficulties or high costs of manufacture entailed therein. For these reasons industrial and commercial processes have been sought which will alleviate the mentioned defects without unduly complicating the isolation and recovery of a refined alkali-soluble, acid-precipitable vegetable seed protein and without raising the costs of production by more than a slight amount. We have now discovered a low-cost treating process which accomplishes these results and which is eminently suitable for commercial use on any scale of magnitude from small laboratory operations to full-size plant scale.

Accordingly, it is an object to provide a low-cost commercial process for refining and improving alkali-soluble acid-precipitable vegetable seed protein.

It is a further object to provide a process of the kind described above, which can be carried out without unduly encumbering the known processes for isolating and/or recovering the vegetable seed protein to which it is applied.

It is another object to effect the refinement of alkali-soluble acid-precipitable vegetable seed protein by treating a dispersion of the seed protein to precipitate calcium ions therefrom as completely as possible in the form of calcium carbonate, a calcium phosphate, a calcium silicate, calcium oxalate, calcium citrate, or mixtures of such calcium salts, and removing said precipitate from the dispersion while holding the vegetable protein dispersed.

It is another object to treat a calcium-ion-containing dispersion of alkali-soluble acid-precipitable vegetable seed protein with added quantities of carbonate, silicate, phosphate, oxalate or citrate anions, or mixtures thereof, thereby to precipitate at least a part of the contained calcium ions, and thereafter to remove the precipitated salts while holding the alkali-soluble, acid-precipitable vegetable protein dispersed.

It is yet another object to refine an extracted alkali-soluble, acid-precipitable vegetable seed protein by adding calcium ions and carbonate, silicate, phosphate, oxalate, and/or citrate anions to a dispersion of said vegetable protein, thereby to effect the "in situ" formation and precipitation of such calcium salts; and subsequently removing said precipitated salts from the dispersion while the latter is at a pH sufficiently high to hold the said vegetable protein dispersed.

These and other objects will be apparent from the following description of the invention and of various exemplifying embodiments thereof.

Various alkali-soluble acid-precipitable vegetable seed proteins may be treated in accordance with the invention as for example, protein derived from soy bean, cottonseed, tung-nut, castor bean, peanut, linseed, etc. The relationship of this invention to prior processes, however, can be illustrated most readily by reference to its application to the industrial soy protein of present-day commerce. In respect to this isolated protein, it was pointed out by Cone and Brown in U. S. Patent No. 1,955,375 that lime-soluble protein from which the lime-insoluble protein had been eliminated (as by the method described in said patent) was a superior form of soy protein for adhesives, particularly such as are used in paper sizing and coating. They pointed out its superior adhesive qualities and advantageous viscosity characteristics. We have found, however, that a soy protein such as produced in accordance with the Cone and Brown teachings may be improved considerably by the practices of the present invention.

In U. S. Patent No. 2,304,099, Julian and Malter pointed out that the Cone and Brown processes possessed certain commercial disadvantages, and showed that improvements in the processing and in the protein could be achieved by hydrolyzing the protein with both caustic alkali and lime. We have found that the present invention affords even further improvements in the protein so produced.

The improvements effected by the practice of the present invention are various in nature: the protein content of isolated proteins may be increased and the ash and non-protein contents may be reduced, thereby yielding a more pure and refined protein; the color of the protein may be improved; the adhesive strength may be increased, the increase being due in part, at least, to the reduction or elimination of calcium; dispersions of the refined protein are clearer, of better color, and contain less undissolved residues. Furthermore, these and other improvements are secured on a commercial basis with low processing costs.

This invention springs from our discovery that certain calcium salts, when precipitated from a dispersion of alkali-soluble acid-precipitable vegetable seed protein, have the property of occluding, adsorbing or absorbing various diverse components of the dispersion, such as colored, gummy and mucilaginous materials, as well as proteinaceous impurities, and of carrying such components with them when the precipitated calcium salts are removed from the dispersion. Moreover, the salts, which are initially flocculent precipitates, agglomerate in time to a coarser, more crystalline mass which aids in clarifying the dispersion. The particular calcium salts which have been found to be effective in this manner are: calcium carbonate, any of the calcium silicates, any of the calcium phosphates, calcium oxalate and calcium citrate. These salts are all insoluble or difficultly-soluble in alkaline protein dispersions and may be precipitated nearly completely, if desired, and then removed in any convenient manner, as by centrifuging, filtering, settling, etc. When carefully and completely removed from the vegetable seed protein dispersion in which they were formed, they ensure a negligibly low calcium content in the dispersion and in the protein which may be recovered from the dispersion. Their adsorbed loads also account for the removal of non-protein materials, inorganic matter, and various color bodies. The removal of the various materials mentioned, and possibly of others, results in a lower ash content in the protein, a higher protein content, better adhesive properties, improved color, less undissolved residue when the refined portein is dispersed, clearer dispersions, and dispersions of better color. Other difficultly-soluble calcium salts have been found to be ineffective in refining vegetable protein; thus, calcium sulfite, sulfate, fluoride, borates, and metaborates have been found to provide no analogous refining action.

Our discoveries concerning the above named calcium salts may be utilized advantageously in a variety of treatments. The principles may be applied in refining an already isolated soy or other vegetable seed protein which is alkali-soluble and acid-precipitable; or in effecting the refinement of such proteins during the processing thereof prior to isolation; or in refining a dispersion of such vegetable protein without subsequently isolating the refined product; or in refining an extract of such vegetable protein; or in producing a refined extract. Examples set forth hereinafter illustrate some of these embodiments of the invention.

It will be understood that in practising the invention, calcium ions and the named anions are incorporated separately in the protein dispersion at some predetermined stage or stages in the treatment or processing of the protein. While we have found that it is generally of little significance whether the calcium ions be introduced ahead of the anions, or whether the reverse sequence be followed, yet in adapting the invention to known extraction or treating processes, it may be desirable to use one sequence in preference to the other. For example, in extracting an alkali-soluble, acid-precipitable protein from soy meal or flour, the meal or flour may be digested with lime water in the first instance, as taught by Cone and Brown, supra. After the undissolved residue has been separated from the lime water to produce a clarified dispersion, one or a mixture of the named anions may be added in sufficient quantity to form a calcium precipitate. On the other hand, a strong alkaline salt such as sodium carbonate may be used in extracting protein from the seed material, and subsequently thereto calcium ions may be introduced in sufficient quantity to be precipitated completely as calcium carbonate.

The invention may also be applied after the extraction stage, as for example during hydrolysis of the protein. It may also be applied after extraction but prior to hydrolysis.

Thus, if a water extraction is used as taught in the Julian and Malter patent, supra, the present invention is advantageously combined with the digestion step of that process in which both alkali and lime are used. The calcium precipitate is desirably formed in the dispersion prior to completion of the hydrolysis step, and may be removed from the dispersion at the same time that the flocculent precipitate mentioned in that patent is removed. Thus, in effect, the refining step is commenced with the digestion step, since calcium ions are therein added, and for convenience is completed during the hydrolysis step (but prior to the termination of that step) by adding one or more suitable calcium precipitating anions to the hydrolysis menstruum. The resulting calcium precipitate is then removed along with the flocculent precipitate.

In effecting the formation and precipitation of the calcium precipitate, it is preferable, of course, to add at least enough of the named anions to combine stoichiometrically with all of the calcium ions, thereby precipitating calcium as completely as possible. An excess of some of the named anions may be used to ensure complete precipitation of calcium, but an excess of the silicate anions should be avoided since the addition of acid to the alkaline protein dispersion to precipitate the refined protein also yields silicic acid which is entrained in the protein precipitate and contaminates it. Stoichiometric proportions between calcium ions and anions are preferable in most instances, but are especially to be sought when silicate anions are employed.

As to the extent to which the calcium ions should be precipitated, we have stated above that complete precipitation thereof is to be preferred. This is because a complete precipitation ensures a negligibly low calcium ion concentration in the protein dispersion. Incomplete precipitation may be practised, however, although such practice generally leads to less marked improvements. We have found that the formation and precipitation of a modicum of calcium precipitate produces some benefits due to the occluded or sorbed impurities carried down with the precipitate. Greater amounts of precipitate produce correspondingly greater improvements. But as long as calcium ions remain in the suspension in concentrations greater than correspond to the slight solubilities of the named calcium salts, the improvements effected by the precipitation of calcium salts may be partially or wholly offset, at least as to ash content, by the remaining soluble calcium ion concentration. For example, if after refinement has been effected by precipitating and separating one or more of the named calcium salts, the protein is precipitated by acidifying the refined dispersion with sulfuric acid, soluble calcium ions in the dispersion will be converted to calcium sulfate, and more or less of this compound will be recovered from the whey along with the protein. Such calcium sulfate is a contaminant in the protein, of course, and its presence is reflected by an increase in the ash content of the protein over the ash content which would prevail if all soluble calcium ions had been removed as completely as possible by forming the refining calcium precipitates. Moreover, soy protein adhesives are considerably impaired in adhesive strength by even traces of calcium in the protein. Accordingly, if incomplete precipitation of the calcium ions is practised, one should weigh the advantages against the disadvantages in determining what extent of incomplete precipitation will produce a favorable compromise for his particular needs or purposes.

It is generally most practical to effect the formation of the refining precipitate in protein dispersions having distinctly alkaline reaction, since the protein may then be held dispersed during the formation, precipitation, agglomeration and removal of the calcium precipitate. The proteins may also be held in dispersion at lower pH values provided these are above the isoelectric point or range of the proteins.

In order to provide alkaline pH values, it is convenient to introduce the calcium-precipitating anions in the form of soluble alkali-metal salts of the respective anions. Metathesis of such salts with calcium hydroxide, for example, will then generate the corresponding alkali-metal hydroxides. Thus,

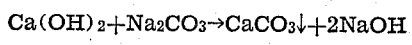

$$Ca(OH)_2 + Na_2CO_3 \rightarrow CaCO_3\downarrow + 2NaOH$$

Soluble potassium or lithium salts containing the named anions may be used as well as the sodium salts, but their greater costs lead to economic considerations. The alkali metal salts may be formed "in situ" from alkali-metal hydroxides and acids containing the named anions, but this is not usually of economic advantage. The calcium ions are generally introduced in the form of lime or hydrated lime, since these forms take part directly in the metathesis as explained above. However, where alkaline pH values are established by other bases such as alkali-metal hydroxides, water-soluble calcium salts may be used to provide the calcium ions.

It will be understood that the introduction of calcium ions to a protein dispersion may occur separate and apart from the refining treatment. The time of the introduction is immaterial so long as the ions are present in the dispersion when needed for forming the refining precipitates. However, as has been pointed out by Cone and Brown, supra, and by Julian and Malter, supra, lime additions to an alkali dispersion of protein induce or produce a flocculent precipitate which is preferably removed before the protein is precipitated from the dispersion. We have indicated above that it is desirable to effect the formation of the calcium precipitate or precipitates in the dispersion in the presence of the flocculent precipitate since the calcium precipitate assists in settling the flocculent precipitate, and makes it easier to remove from the dispersion. Our invention contemplates the concurrent use of calcium ions for such separate effects.

The invention may be applied to protein dispersions having a wide range of protein concentrations. Considerations of practicality, however, may impose some restrictions since it may be impractical under some circumstances to treat very dilute protein dispersions and concentrated protein dispersions may be so viscous that the effective separation of the calcium precipitate becomes a practical problem. The viscosity of protein dispersions depends on other factors than protein concentration, e. g., pH, time, temperature, the extent of denaturing, and the denaturing treatment, so that no numerical limits on protein concentration per se can be stated. Persons skilled in the art are well able to adapt the principles of this invention to their particular dispersions or needs.

The following examples illustrate the principles of our invention as discussed hereinabove.

*Example 1*

5.5 liters of soy bean curd obtained by acid precipitation from 25 liters of a clarified (screened) alkaline extract derived from 1 kg. of soy bean flakes is dispersed by 17 g. lime and 30 g. caustic soda after diluting with water to 15 liters. 24 g. of soda ash anhydrous is added. After a suitable period elapses for agglomeration of the precipitate, the dispersion is clarified. Subsequently, and after a suitable time elapses for hydrolysis, the protein is precipitated by acid, separated from the whey, and dried.

*Example 2*

330 g. of a commercial soy bean protein are dispersed in 15 liters of water by the addition of 30 g. caustic soda, after which is added 17 g. lime followed by 65 g. of sodium metasilicate ($Na_2SiO_3 \cdot 9H_2O$). The precipitate is allowed to agglomerate, after which the dispersion is clarified. Hydrolysis of the protein is continued after clarification, and after desired hydrolysis is secured, the protein is precipitated by addition of acid, then separated from the whey, and dried. The original protein was much poorer in clarity and color when dissolved, and had a protein content dry basis of 97.7% compared with 100% for the treated protein (per cent N $\times$ 6.25). The insoluble portion on dispersing the proteins in alkalis amounted to 5% for the original protein and only 0.5% for the refined protein.

*Example 3*

To 15 liters of a protein dispersion containing 330 g. soy protein and 21 g. calcium hydroxide was added 40 ml. of 50% sodium hydroxide (30 g. solid NaOH). One hour after adding the sodium hydroxide, the dispersion was clarified by centrifuging, thereby reducing the volume of undissolved solids from 7% to a trace. Six hours after adding the sodium hydroxide, the dispersion was acidified to a pH of 4.6, and the precipitated protein was settled, drained free of whey, filtered and dried.

*Example 4*

To 15 liters of a soy protein dispersion containing 330 g. soy protein and 21 g. Ca(OH)$_2$ as in Example 3 was added 40 ml. of 50% sodium hydroxide, and 5 minutes later 30 g. anhydrous soda ash was added. After one hour the undissolved solids were removed by centrifuging. Six hours after adding the sodium hydroxide, protein was precipitated from the clarified liquor by acidifying to a pH of 4.6. The precipitated protein was settled, drained free of whey, filtered and dried.

Example 5

15 liters of a soy protein dispersion was treated identically as in Example 4 except that 75 g. sodium silicate ($Na_2SiO_3 \cdot 9H_2O$) was used in place of the 30 g. soda ash anhydrous.

When the dried proteins obtained by the treatments of Examples 3, 4 and 5 were dispersed in soda ash solutions, the solutions made from the proteins of Examples 4 and 5 were almost transparent while that from the protein of Example 3 was opaque and cloudy. The viscosities of the three solutions were in the same range. In Example 3, no calcium precipitant was added, while in Examples 4 and 5 refinement was carried out with anions capable of precipitating calcium ion.

Example 6

330 g. of dry isolated soy protein was slurred in water to a volume of 15 liters and 66 ml. of 50% caustic soda solution added. One-half hour after adding the caustic soda, the liquor was clarified by centrifuging, then the clarified liquor was acidified to a pH of 4.6, the protein was settled, drained free of whey, filtered and dried.

Example 7

330 g. of the dry isolated soy protein used in Example 6 was slurried in water to a volume of 15 liters, then 16.8 g. calcium hydroxide was added, followed 3 minutes later by 40 ml. 50% caustic soda, followed 3 minutes later by 24 g. soda ash. After one-half hour the liquor was centrifuged and 13.5 liters of clear liquor were recovered. The clear liquor was acidified to pH 4.6, the protein was settled, then drained, filtered and dried.

Samples of the proteins produced in Examples 6 and 7 were analyzed for ash and protein content, and other samples were dissolved in soda ash solutions to test for clearness of the solutions. The results are tabulated:

| Example | Ash, Per Cent | Protein, Dry Basis | Clarity |
|---|---|---|---|
| 6 | 1.0 | 98.0 | cloudy. |
| 7 | 0.6 | 99.5 | clear. |

Examples 8–23

In these examples, the order of the treating steps and the chemicals used in the steps are tabulated hereinafter. The alki-soluble acid-precipitable protein treated for refinement in these examples was an isolated soy protein, 330 g. of which was slurried in water to a total volume of 15 liters. To this slurry was added the chemicals indicated in the table in the order in which they occur in the table, a time interval of a few minutes occurring between successive additions of the chemicals. The various chemicals employed, and their respective amounts, were selected on the basis of principles and factors which are well understood in the art, to the end that hydrolysis of the protein would proceed concurrently with the refining treatment, but would not attain its desired extent in a time interval shorter than we have found suitable for precipitation, agglomeration and removal of the refining calcium precipitate. In each example, the refining precipitate was removed within one to two hours after adding the last chemical. After the precipitate had been removed, the hydrolysis of each protein batch was permitted to proceed to the same predetermined extent, then the batch was acidified to a pH of 4.6 to precipitate the hydrolyzed and refined protein. After the protein had been precipitated from the clarified liquor, it was settled, drained free of whey, filtered and dried. In the table where NaOH is mentioned, a 50% solution is meant. Where sodium silicates are named, the symbol A/S is used to indicate the ratio of alkali to silicate of the material used.

| | First Chemical | | Second Chemical | | Third Chemical | |
|---|---|---|---|---|---|---|
| Ex. | Formula | Amount | Formula | Amount | Formula | Amount |
| 8 | $Ca(OH)_2$ | 16.8 g | NaOH | 40 ml | $Na_3PO_4 \cdot 12H_2O$ | 57.5 g. |
| 9 | $Ca(OH)_2$ | 16.8 g | NaOH | 40 ml | $Na_2HPO_4 \cdot 12H_2O$ | 54 g. |
| 10 | $Ca(OH)_2$ | 16.8 g | NaOH | 40 ml | $Na_2SiO_3 \cdot 9H_2O$ A/S—1:1 | 64.5 g. |
| 11 | $Ca(OH)_2$ | 16.8 g | NaOH | 40 ml | Liquid 41° Bé. sodium silicate A/S—1:2. | 25 ml. |
| 12 | $Ca(OH)_2$ | 16.8 g | NaOH | 40 ml | Liquid 41° Bé. sodium silicate A/S—1:3.22. | 25 ml. |
| 13 | NaOH | 40 ml | $Ca(OH)_2$ | 16.8 g | $Na_2SiO_3 \cdot 9H_2O$ | 60 g. |
| 14 | $Na_2CO_3$ | 24 g | NaOH | 40 ml | $Ca(OH)_2$ | 16.8 g. |
| 15 | $Na_2CO_3$ | 24 g | $Ca(OH)_2$ | 16.8 g | NaOH | 40 ml. |
| 16 | NaOH | 40 ml | $Ca(OH)_2$ | 16.8 g | $Na_2CO_3$ | 24 g. |
| 17 | $Ca(OH)_2$ | 16.8 g | NaOH | 40 ml | $Na_2C_2O_4$ | 30.4 g. |
| 18 | NaOH | 40 ml | $Ca(OH)_2$ | 16.8 g | $Na_2C_2O_4$ | 30.4 g. |
| 19 | $Ca(OH)_2$ | 16.8 g | NaOH | 40 ml | $Na_3C_6H_5O_7 \cdot 2H_2O$ Sodium Citrate. | 54 g. |
| 20 | $Ca(OH)_2$ | 33.6 g | $Na_2CO_3$ | 48.2 g | none | |
| 21 | $Ca(OH)_2$ | 50.4 g | $Na_2CO_3$ | 72.3 g | do | |
| 22 | $Ca(OH)_2$ | 37.2 g | $Na_2CO_3$ | 86.4 g | do | |
| 23 | $Ca(OH)_2$ | 50.4 g | $Na_2CO_3$ | 96.4 g | do | |

The refined protein prepared by each of the treatments of Examples 8–23 was lower in ash content, of improved color and adhesive strength, of higher protein content, and produced alkaline dispersions of greater clarity having reduced contents of undissolved matter, as compared with the same source protein treated under comparable conditions of alkalinity but with none of the refining treatment afforded by a calcium precipitate of the group of salts identified with the present invention.

In the foregoing description of the invention and in the following claims, the term "protein dispersion" is used in a generic sense to refer to a vegetable seed protein of an alkali-soluble, acid-precipitable nature in aqueous colloidal state having a pH value on the alkaline side of its isoelectric range or point, and with or without associated impurities derived from the seed meal of its origin.

Having disclosed our invention, what we claim is:

1. The method of refining alkali-soluble, acid-precipitable vegetable seed protein which consists of: (1) providing an aqueous dispersion containing alkali-soluble, acid-precipitable vegetable seed protein which is to be refined; (2) maintaining the pH of said dispersion sufficiently high to keep the said protein dispersed while effecting in its presence the in-situ ionic formation and precipitation of at least one calcium salt having an anion selected from the group consisting of carbonate silicate, phosphate, oxalate and citrate, the quantity of anion of said group being at least sufficient to combine with a major portion of the calcium ions in said dispersion; and (3) removing from the dispersion the precipitate together with such other insoluble matter as may then exist, while the dispersion is maintained at a pH sufficiently high to keep the alkali-soluble, acid-precipitable protein dispersed, thereby to provide a clarified dispersion of refined alkali-soluble acid-precipitable vegetable seed protein.

2. The method of producing an aqueous dispersion of refined, isolated alkali-soluble, acid-precipitable vegetable seed protein which comprises: (1) providing an aqueous dispersion of alkali-soluble, acid-precipitable vegetable seed protein, said dispersion containing more than enough calcium ions to saturate said dispersion when all of said calcium ions are combined with at least one anion of the group named in step (2); (2) maintaining the pH of said dispersion sufficiently high to keep the said protein dispersed while adding to said dispersion at least one calcium-precipitating anion selected from the group consisting of carbonate, silicate, phosphate, oxalate and citrate, the added anion being sufficient in quantity to precipitate in the form of calcium salts substantially all of the calcium ions in said dispersion; and (3) physically removing the resulting precipitated salts from the dispersion, together with any other solid matter therein, while the dispersion is maintained at a pH sufficiently high to keep the said protein therein dispersed, thereby to produce a clarified dispersion of refined isolated, alkali-soluble, and acid-precipitable protein.

3. The method as claimed in claim 2 wherein the added anions precipitate the calcium ions in the form of calcium carbonate.

4. The method as claimed in claim 2 wherein the added anions precipitate the calcium ions in the form of calcium silicate.

5. The method as claimed in claim 2 wherein the added anions precipitate the calcium ions in the form of calcium phosphate.

6. The method of refining isolated alkali-soluble, acid-precipitable vegetable seed protein which comprises: (1) providing an alkaline aqueous dispersion composed essentially of the said isolated alkali-soluble, acid-precipitable protein which is to be refined; (a) separately adding thereto in any order calcium ions, and calcium-precipitating anions selected from the group consisting of carbonate, silicate, phosphate, oxalate and citrate, while maintaining the pH of the dispersion sufficiently high to keep the said isolated protein dispersed, the added quantity of anions being sufficient to precipitate in the form of calcium salts substantially all of the added calcium ions together with any other calcium ions in the dispersion; and (3) physically separating the precipitated salts from the protein dispersion together with any other solid matter therein, thereby to provide a clarified dispersion of the said isolated alkali-soluble, acid-precipitable protein in a refined state.

7. The method as claimed in claim 6 wherein the added anions precipitate the calcium ions in the form of calcium carbonate.

8. The method as claimed in claim 6 wherein the added anions precipitate the calcium ions in the form of calcium silicate.

9. The method as claimed in claim 6 wherein the added anions precipitate the calcium ions in the form of calcium phosphate.

10. The method of preparing an aqueous dispersion of refined, alkali-soluble, acid-precipitable vegetable seed protein which comprises: (1) providing an alkaline aqueous dispersion composed essentially of isolated alkali-soluble, acid-precipitable vegetable seed protein; (2) adding thereto more than enough calcium ions to saturate said dispersion when all of the added ions are combined with at least one anion of the group named in step (3); (3) maintaining the pH of said dispersion sufficiently high to keep the said protein dispersed while adding to said dispersion at least one calcium-precipitating anion selected from the group consisting of carbonate, silicate, phosphate, oxalate and citrate, the added anion being of sufficient quantity to precipitate in the form of calcium salts substantially all of the added calcium ions; and (4) physically removing the resulting precipitated calcium salts from the dispersion together with any other solid matter then present therein, while the dispersion is maintained at a pH sufficiently high to keep the protein therein dispersed, thereby to provide a dispersion of refined, isolated alkali-soluble, acid-precipitable vegetable seed protein.

11. The method as claimed in claim 10 wherein the added anions precipitate the calcium ions as calcium carbonate.

12. The method of preparing an aqueous dispersion of refined alkali-soluble, acid-precipitable vegetable seed protein which comprises: (1) providing an alkaline aqueous dispersion composed essentially of isolated alkali-soluble, acid-precipitable vegetable seed protein; (2) adding thereto more than enough of at least one anion selected from the group consisting of carbonate, silicate, phosphate, oxalate and citrate to saturate said dispersion when the added anions are combined with calcium ions to form calcium salts; (3) maintaining the pH of said dispersion sufficiently high to keep the said protein dispersed while adding calcium ions to said dispersion in an amount not substantially in excess of that required to precipitate the said added anions; and (4) physically removing the resulting precipitated calcium salts from the dispersion together with any other solid matter then present therein, while the dispersion is maintained at a pH sufficiently high to keep the protein therein dispersed, thereby to provide a dispersion of refined, isolated alkali-soluble, acid-precipitable vegetable seed protein.

13. The method as claimed in claim 12 wherein the added anions are carbonate ions.

14. The method of producing a refined isolated alkali-soluble, acid-precipitable vegetable seed protein which consists of: (1) providing an aqueous dispersion of extracted alkali-soluble, acid-precipitable vegetable seed protein, said dispersion containing more than enough calcium ions to saturate said dispersion when all of said calcium ions are combined with at least one anion of the group named in step (2); (2) maintaining the pH of said dispersion sufficiently high to keep the said protein dispersed while adding to said dispersion at least one calcium precipitating anion selected from the group consisting of carbonate, silicate, phosphate, oxalate and citrate, the added anions being sufficient in quantity to precipitate in the form of calcium salts substantially all of the calcium ions in said dispersion together with any other calcium ions in the dispersion; (3) physically removing the resulting precipitated salts from the dispersion together with any other solid matter then present therein, while the dispersion is maintained at a pH sufficiently high to keep the said protein therein dispersed; (4) precipitating the dispersed protein by adjusting the pH of the dispersion to within the iso-electric range of the protein; and (5) recovering the precipitated and refined protein.

15. The method as claimed in claim 14 where the anion is the carbonate ion.

PERCY L. JULIAN.
SIDNEY J. CIRCLE.
ROBERT T. MacDONALD.

REFERENCES CITED

The following references are of record in the file of this patent:

UNITED STATES PATENTS

| Number | Name | Date |
| --- | --- | --- |
| 1,955,375 | Cone et al. | Apr. 17, 1934 |
| 2,097,239 | Bradshaw | Oct. 26, 1937 |
| 2,271,499 | Rice | Jan. 27, 1942 |
| 2,284,700 | Wahlforss | June 2, 1942 |
| 2,361,057 | Ratzer | Oct. 24, 1944 |
| 2,429,579 | Horvath | Oct. 21, 1947 |